United States Patent [19]

Betschart

[11] 4,072,669
[45] Feb. 7, 1978

[54] PREPARATION OF PROTEIN ISOLATES FROM SAFFLOWER SEEDS

[75] Inventor: Antoinette A. Betschart, Albany, Calif.

[73] Assignee: The United States of America as represented by the Secretary of Agriculture, Washington, D.C.

[21] Appl. No.: 775,227

[22] Filed: Mar. 7, 1977

[51] Int. Cl.$^2$ .............................................. A23J 1/14
[52] U.S. Cl. .................................. 260/123.5; 426/549; 426/589; 426/590; 426/629; 426/656
[58] Field of Search ....................................... 260/123.5

[56] References Cited

U.S. PATENT DOCUMENTS 3,099,649  7/1963  Kawamura et al. ............... 260/123.5
3,127,388  3/1964  Johnson et al. ................... 260/123.5

*Primary Examiner*—Walter C. Danison
*Attorney, Agent, or Firm*—M. Howard Silverstein; David G. McConnell; Theodore J. Leitereg

[57] ABSTRACT

Protein isolates with improved properties are prepared from safflower seeds by applying to the seeds the following steps: (a) pressing the seeds to remove oil therefrom, (b) extracting the press-cake with hexane at 20°–30° C. to remove residual oil, (c) drying the so-extracted press-cake 20°–30° C., (d) treating the press-cake with aqueous alkali at pH 8–10, (e) separating a juice from the press cake and acidifying the juice of pH 6.0, and (f) separating a protein isolate from the juice and washing and drying it.

4 Claims, No Drawings

PREPARATION OF PROTEIN ISOLATES FROM SAFFLOWER SEEDS

BACKGROUND OF THE INVENTION

1. Field of the Invention

This invention relates, in general, to the processing of safflower seeds and has as its primary object the provision of novel processes for preparing protein isolates therefrom which are useful as food additives. Further objects and advantages of the invention will be evident from the following description wherein parts and percentages are by weight unless otherwise specified.

2. Description of the Prior Art

Safflower seeds are well-known as a valuable source of oil and are primarily grown for such purpose. Conventionally, oil is extracted from safflower seeds by grinding or flaking the seeds and pressing them. The press cake is further extracted with hexane at a temperature of about 107°–110° C. to recover additional oil.

Heretofor, the press cake, after removal of residual oil, has been used for animal feed. A number of beneficial proteins are present in the press cake; however, without further purification the press cake is not suitable for human consumption.

Due to the recent emphasis on increasing the number of sources of plant proteins, procedures have been developed for extracting useful protein isolates from safflower seed. Some of these procedures involve purely mechanical operations such as cracking or milling the seeds and then classifying them on the basis of particle size.

Chemical methods for extracting protein isolates from safflower seeds have also been reported. In one of these methods the press cake obtained after oil extraction as described above is treated with dilute alkali. The juice which forms as a result is separated from solid material and then acidified to pH of 4 to 5 (5 being the iso-electric point of the proteins therein) to precipitate a protein isolate. The precipitate is washed and dried and is ready for use in fortifying foods and the like.

SUMMARY OF THE INVENTION

I have discovered a process for securing a protein isolate, suitable for human consumption, from safflower seeds. In the process of the invention safflower seeds are crushed and pressed to remove oil therefrom. The press cake is extracted with hexane at 20°–30° C. to effect further removal of oil and then is dried at 20°–30° C. Following the drying step the press cake is mixed with water and alkali is added to the mixture to adjust the pH thereof to about 8–10. The juice is separated from the residue and acidified to pH 6.0. The protein isolate which precipitates is separated from the juice, washed, and dried.

Although the above process appears to superficially resemble the prior art processes, there are critical differences which are responsible for the production of a protein isolate with properties superior to the known protein isolates from safflower seeds.

One critical difference is that the hexane extraction of the press-cake is carried out at 20°–30° C. In addition, the press cake, after extraction with hexane, is dried at 20°–30° C. In contrast, the prior art methods use elevated temperatures during the hexane extraction and drying steps. The use of lower temperatures for the extraction and drying result in a greater yield of protein product.

A further difference between the prior art processes and the method of the invention concerns the pH at which the protein isolate is precipitated. In the known processes the protein precipitates are formed at pH 4–5. The isoelectric point of the proteins in safflower seed is pH 5 whereat maximum precipitation occurs. However, in my process the protein isolate is formed at pH 6.0.

The most important advantage of the invention is that the protein isolate produced thereby is an excellent source of protein, superior to protein isolates prepared according to the prior art processes. In the first place, the product of the invention contains more protein than other products. More important, however, is the fact that the product of the invention is a better quality protein product in that it contains lesser amounts of contaminants than other products. Thus, the efficiency of the protein, or in other words the nutritional balance of the protein, is greater in the protein isolate of the invention. This means that the product of the invention supplies more of the different amino acids necessary for growth and development.

Another advantage of the invention is that the protein product contains less fat, fiber, and ash than the known products. Although some fat is necessary in the human diet, too much fat is to be avoided. Furthermore, fiber and ash interfere with the digestibility of the protein as well as its functionality in food systems. Consequently, the products of the invention are more suitable for human dietary needs than the prior art products.

A further item is the improved solubility of the product of the invention in acidic medium. The present product is much more soluble at pH 4 than the known products. As a result the protein isolate of the invention is suited for fortifying acidic foods and beverages, such as soups, fruit juices, carbonated beverages, and so forth.

The present protein isolate exhibits enhanced foaming ability over those concentrates produced by conventional processes. For example, the instant product has a foaming capacity of approximately 400% whereas the protein isolate obtained by precipitation at pH 5 has a foaming capacity of 250%. The capacity to incorporate air and form a foam means that the product has applications in air-leavened batters and doughs, whipped toppings and desserts, etc.

Another advantage of the invention is that the protein isolated in accordance with the procedures of the invention has superior baking properties when compared to known safflower protein isolates or to soy protein isolates. Thus, baked products fortified with the instant protein product exhibit excellent volume, grain, texture, and break and shred.

DESCRIPTION OF THE PREFERRED EMBODIMENTS

The process of the invention may be applied to safflower seeds themselves or to the meal, press-cake, or other residues produced by pressing or expelling oil from the seeds.

In a first step in the process of the invention residual oil is removed from the pressed material by means of extraction with hexane. If the invention is applied to safflower seeds themselves, they must be pressed to expel bulk amounts of oil prior to application thereto of the first step in the method of the invention. Generally, about 1 to 4 parts of hexane are used per part of press-cake. The temperature of the extraction is about 20°–30° C. The press-cake is separated from the hexane and air-dried at a temperature of about 20°–30° C. It is within the compass of the invention to extract the press-cake with hexane successively until all of the oil is removed.

Since hexane is readily available and inexpensive, it is generally preferred for use in the invention. However, it is by no means the only solvent that can be employed. For example, one may use any liquid hydrocarbon, or mixture thereof, fluorinated hydrocarbon, oxygenated solvent, which is volatile enough to be removed from the press-cake under the above-specified drying conditions and which will, of course, extract oil from the press-cake.

The dry press-cake is mixed with water in the proportion of 10 to 100 parts of water per part of press-cake. Then, an alkalizer is added to the above mixture to adjust the pH thereof to about 8 to 10. Ammonia, sodium and potassium hydroxide, and the like are suitable; furthermore, buffer systems such as sodium carbonate-sodium bicarbonate or sodium borate are effective. It is, of course, within the compass of the invention to mix the press-cake with an aqueous solution of alkalizer as an alternative to the step-wise addition of water and an alkalizer. Contact between the press-cake and the aqueous alkalizer is maintained for about 15 to 30 minutes. Usually, the temperature of the mixture is about 25°–50° C.

Following treatment with alkali the mixture is treated to separate a juice containing soluble proteins from a solid material. Any conventional means for separating a juice from solids can be used; for example, the mixture can be centrifuged. Other methods will be apparent to those skilled in the art.

Next, the juice is mixed with acid to adjust its pH to 6.0. Any food-grade acid can be used. Thus, one may apply hydrochloric acid, sulfuric acid, phosphoric acid, citric acid, tartaric acid, and the like to achieve the desired pH. It is important to note that the pH adjustment to 6.0 is critical; it is only at this pH that the improved protein isolate of the invention is obtained. Generally, the protein concentrate precipitates in about 15 to 60 seconds.

The precipitated product is collected by such conventional procedures as centrifugation and decantation, filtration, etc. Following its collection the wet product is washed with water at pH 6.0. In general, 5 to 10 parts of water per part of product are used. Then, food-grade alkali, such as sodium hydroxide and the like, is added to the wet product, after separation from the wash liquid, to adjust the pH thereof to 7.0, i.e., to neutralize the product. Finally, the wet, neutralized material is dried by such methods as drum-drying, freeze-drying, spray-drying, and so forth.

The protein isolate prepared from safflower seeds in accordance with the invention contains 91–96% protein, 0.30–0.50% crude fat, 0.14–0.34% crude fiber, and 0.60–0.90% crude ash, based on the weight of the isolate, and the remainder carbohydrate, by difference.

It should be noted that the process of the invention and its product are totally unexpected in view of the prior art. As mentioned earlier, the prior art methods employ a pH of 4–5, where pH 5 is the isoelectric point, i.e., the point whereat maximum precipitation of protein occurs. Thus, the skilled artisan would not consider using pH 6 in the prior art method because a lesser yield of protein would be expected. Furthermore, one skilled in the art would expect the protein isolated at pH 6 to have the same properties as that precipitated at pH 4–5.

I found, surprisingly, that the yield of protein isolated at pH 6 is approximately equal to that obtained at pH 5, but the protein isolate secured at pH 6 is a cleaner (containing less fiber, ash, etc.) product than the prior art isolates. More importantly, however, the product of the invention possesses certain properties, as described hereinabove, which are superior to those properties of the known protein isolates.

EXAMPLES

The invention is further demonstrated by the following illustrative examples. Some of the experiments reported herein are not in accordance with the invention but are provided for purposes of comparison.

EXAMPLE 1

Preparation of Protein Concentrate from Safflower

A. A safflower seed press-cake was obtained from a commercial processor; the press-cake had been prepared by passing safflower seeds through an expeller to separate the oil contained therein.

The press-cake (19 kg.) was treated with two 27 l.-portions of hexane at 25° C. for 15 minutes. The hexane was separated from the press-cake, which was then air-dried at 25° C.

Then, 160 l. of water, adjusted to pH 8 with 2.16 l. of 1N aqueous NaOH was added to 16 kg. of dry press-cake. Contact between the press-cake and the alkalizer was maintained, with gentle agitation, for 30 min. at a temperature of 25° C. The pH was maintained at 8 throughout this period. The mixture was centrifuged and the aqueous solution (juice) was decanted.

The juice from above was mixed with 960 ml. of 1N hydrochloric acid to bring its pH to 6.0. The precipitated product was collected by centrifugation, washed with 40 l. of water at pH 6.0, and then neutralized to pH 7.0 by addition of 240 ml. of 1N sodium hydroxide.

The wet product was freeze-dried and weighed 3.84 kg.

B. The procedure outlined in A was repeated except that the pH of the alkaline extract was adjusted to 5.0. The dried product weighed 4.16 kg.

The results are tabularized below.

| Run | Protein (N × 5.3)(%) | Crude Fat (%) | Crude Fiber (%) | Ash (%) |
|---|---|---|---|---|
| A | 95.60 | 0.30 | 0.14 | 0.61 |
| B[1] | 90.15 | 0.53 | 0.21 | 1.21 |

[1]Not in accordance with the invention.

EXAMPLE 2

Solubility of Safflower Protein Isolate

The product (200 mg.) from Example 1, Part A, was added to 10 ml. of water at pH 4.0. The solubility was determined to be 86%. Only 44% of the product from Example 1, Part B, was soluble in water at pH 4.0.

EXAMPLE 3

Baking Properties of Safflower Protein Isolate

The baking methods and formulations used were patterned after government purchase specifications on soy-fortified flour described in Agricultural Stabilization and Conservation Service-USDA-Announcement W-F9, September 27, 1972.

The formulation was as follows:

| Ingredient | Weight (g.) | Proportion (% bwf[1]) |
|---|---|---|
| Wheat flour | 100 | 100 |
| Salt | 2 | 2 |
| Sugar | 4 | 4 |
| Shortening | 3 | 3 |
| Yeast | 2.5 | 2.5 |
| Potassium bromate | 10 ppm[2] | 10 ppm[2] |
| Fortificant | 5 | 5 |

[1] Based on the weight of flour, i.e., wheat flour plus fortificant.
[2] Parts per million Doughs were prepared according to the above recipe using as the fortificant--product produced in accordance with the invention in Example 1, Part A; product of Example 1, Part B; and wheat flour as a control. The dough was formed into loaves and baked at a temperature of 218° C. for 25 min. The loaf volume of the so-produced loaves was determined. The results are summarized below.

| Fortificant | Amount (%) | Load Volume (cc) |
|---|---|---|
| A[1] | 5 | 720 |
| B[2] | 5 | 650 |
| Wheat flour control | — | 754 |

[1] Safflower Protein Isolate produced in accordance with the invention and precipitated at pH 6.0.
[2] Saffower Protein Isolate precipitated at pH 5.0, not in accordance with the invention.

Loaves fortified with the protein concentrate of the invention exhibited better texture and grain than those fortified with conventional products.

EXAMPLE 4

Foaming Capacity of Safflower Protein Isolate

The product (5 g.) from Example 1, Part A, was placed in 95 ml. of water and whipped for 6 minutes in a Hamilton Beach mixer at setting 7. The increase in volume was determined.

The above procedure was repeated using the product of Example 1, Part B.

The results are summarized below.

| Foaming Agent | Amount (%) | Volume Increase (%) |
|---|---|---|
| A | 5 | 420 |
| B[1] | 5 | 240 |

[1] Not in accordance with the invention.

Having thus described my invention, I claim:
1. A process for preparing a protein isolate from safflower seeds, which comprises the steps of
   a. pressing the seeds to remove oil and to form a press-cake,
   b. extracting the press-cake with hexane at 20°–30° C. to remove residual oil,
   c. separating the press-cake from the hexane,
   d. drying the press-cake at 20°–30° C.,
   e. applying an aqueous alkalizer to the press-cake at a pH of 8 to 10,
   f. separating a juice containing soluble proteins therefrom,
   g. acidifying the juice to pH 6.0 to precipitate a protein isolate,
   h. separating the protein isolate therefrom, and
   i. washing the protein isolate with water at pH 6.0 and drying it.
2. The process of claim 1 wherein the protein isolate in Step i is neutralized prior to drying it.
3. A protein isolate prepared from safflower seeds according to claim 1.
4. The protein isolate of claim 3 containing 91–96% protein, 0.30–0.50% crude fat, 0.14–0.34% crude fiber, and 0.60–0.90% crude ash, based on the weight of the isolate.

* * * * *